TELEVISION RECORDING SYSTEM

Filed June 29, 1953 2 Sheets-Sheet 1

INVENTOR.
William D. Houghton
BY [signature]
ATTORNEY

June 23, 1959 W. D. HOUGHTON 2,892,017

TELEVISION RECORDING SYSTEM

Filed June 29, 1953 2 Sheets-Sheet 2

INVENTOR.
William D. Houghton
BY [signature]
ATTORNEY 2,892,017
Patented June 23, 1959

2,892,017

TELEVISION RECORDING SYSTEM

William D. Houghton, Princeton, N.J., assignor to Radio Corporation of America, a corporation of Delaware Application June 29, 1953, Serial No. 364,747

10 Claims. (Cl. 178—5.4)

This invention relates to a means and method of recording wide frequency range signals, and more particularly to the recording of color television signals on magnetic tape.

While the magnetic recording of audio signals has presently reached a relatively advanced stage, the upper limit on frequencies so recorded is approximately 100 kc. In television systems a usable bandwidth of 0–4 mc. has become the standard of the United States. In an application of the present invention and assigned to the same assignee, Serial No. 519,420, filed July 1, 1955 which is a continuation in part of an application Serial No. 469,415, filed November 17, 1954, now abandoned which is a continuation in part of an application Serial No. 362,887, filed June 19, 1953, now abandoned, a system for tape recording of conventional black and white television signals upon a single track of magnetic tape was explained. This system produced a highly satisfactory image and had a frequency range of 200 cycles per second to approximately 2.7–3 megacycles.

Tape recording of television signals in general has numerous advantages. One of these is that signals so recorded can be played back almost instantaneously, and do not require intermediate processing such as is customary with conventional photographic film recording. Moreover, this latter system requires eleborate equipment and a source of water as well as a dark room. The process of developing the film may be highly critical and dependent for satisfactory results upon exact temperature and humidity control.

Still another advantage of magnetic tape recording is its inexpensiveness. The paraphernalia and equipment referred to above represents a heavy initial outlay and substantial operating expenditures. Since raw film is very expensive in comparison with magnetic tape, it is obvious that considerable savings would accrue through use of the latter material. With the advent of kinescope recording on a great scale within the past several years, television has become an even greater market for film than the movie industry.

Further advantages of tape recording are its simplicity and ease in editing and splicing. Also after signals have been recorded on tape they may be conveniently erased so that the tape may be used numerous times with no appreciable harmful effects.

The system disclosed in the application previously referred to was highly successful in storing and reproducing monochrome video signals on a single track of conventional one-quarter inch magnetic tape. When color video signals are to be tape recorded, however, different factors enter the picture. Signal specifications of the NTSC (National Television Systems Committee) used for field test purposes in 1952 called for the transmission of a so-called "luminance" signal representative of the brightness information in the televised object as well as the simultaneous transmission of two so-called "color difference" signals which represented the difference between the luminance signal and each of two signals corresponding to hues in the televised object, e.g., red and blue. These color difference signals are used to modulate a subcarrier, usually approximately 3.58 mc., at phase angles 90° apart. The luminance signal is added to the modulation products and the combined signals are transmitted, together with added synchronizing, blanking and burst signals, as a single composite video wave.

The present invention comprises a means and method for the recording of color television signals on magnetic tape. The tape area is divided into four parallel longitudinal tracks on which the luminance signal, the two color difference signals, and the audio signals are simultaneously impressed. Before the luminance and color difference signals are impressed, however, they are passed through a special recording driving amplifier which, together with specially constructed transducing heads, results in a predetermined response for the entire range of frequencies involved. A special method of controlling the velocity of the tape past the transducing heads may be employed which operates by comparing the phase of synchronizing signals (hereinafter referred to as "sync" signals) recorded by the transducers with sync signals emanating from a local, highly stabilized source. For playback purposes a set of transducing heads recovers the magnetically recorded signals from their respective tracks, and applies them to a set of exceptionally sensitive and noise-free playback amplifiers.

On playback the luminance and color difference signals which may have been recovered and which contain either sync and/or blanking pulses, are completely cut off (or removed) during the blanking interval so as to permit the insertion of new blanking, sync and burst signals. Then the color difference signals are used to modulate various phases of a color subcarrier wave which is locally produced. The modulation products of the color difference signal (obtained from the tape) and the subcarrier are then added with the luminance signal (obtained from the tape) to produce an output composite video wave conforming to NTSC signal specifications. In one form of this invention, sync signals are separated from the recovered luminance signal track, or from any other track in which they may appear and used in a manner similar to that on the recording end for controlling the tape velocity. It is also possible to adapt the composite color output wave for use with the most recent NTSC signal specifications which were prescribed and promulgated on February 2, 1953. The output composite wave may be used in either of the systems as mentioned above and is applied to an appropriate utilization circuit such as a transmitter, monitor or other display equipment.

An object of the present invention is to provide a means and method for storing color video signals that can be played back immediately on a moveable medium.

A further object of the invention is to provide apparatus for recording and playing back of a number of inter-related types of signals representative of a televised object from which a complete color television image may be reconstructed.

Another object of this invention is to provide a system for locking in the various sync, burst and blanking signals to maintain the constant mutual phase relation required in certain color television systems.

Still another object of the invention is to provide a system for recording and playing back of signals carrying complete color and sound information derived from a televised object on four parallel tracks of a moveable magnetic medium.

Other objects and features of the invention as well as a more complete understanding of its nature will become readily apparent through a reading of the following description in conjunction with the accompanying drawings in which.

Figure 1:
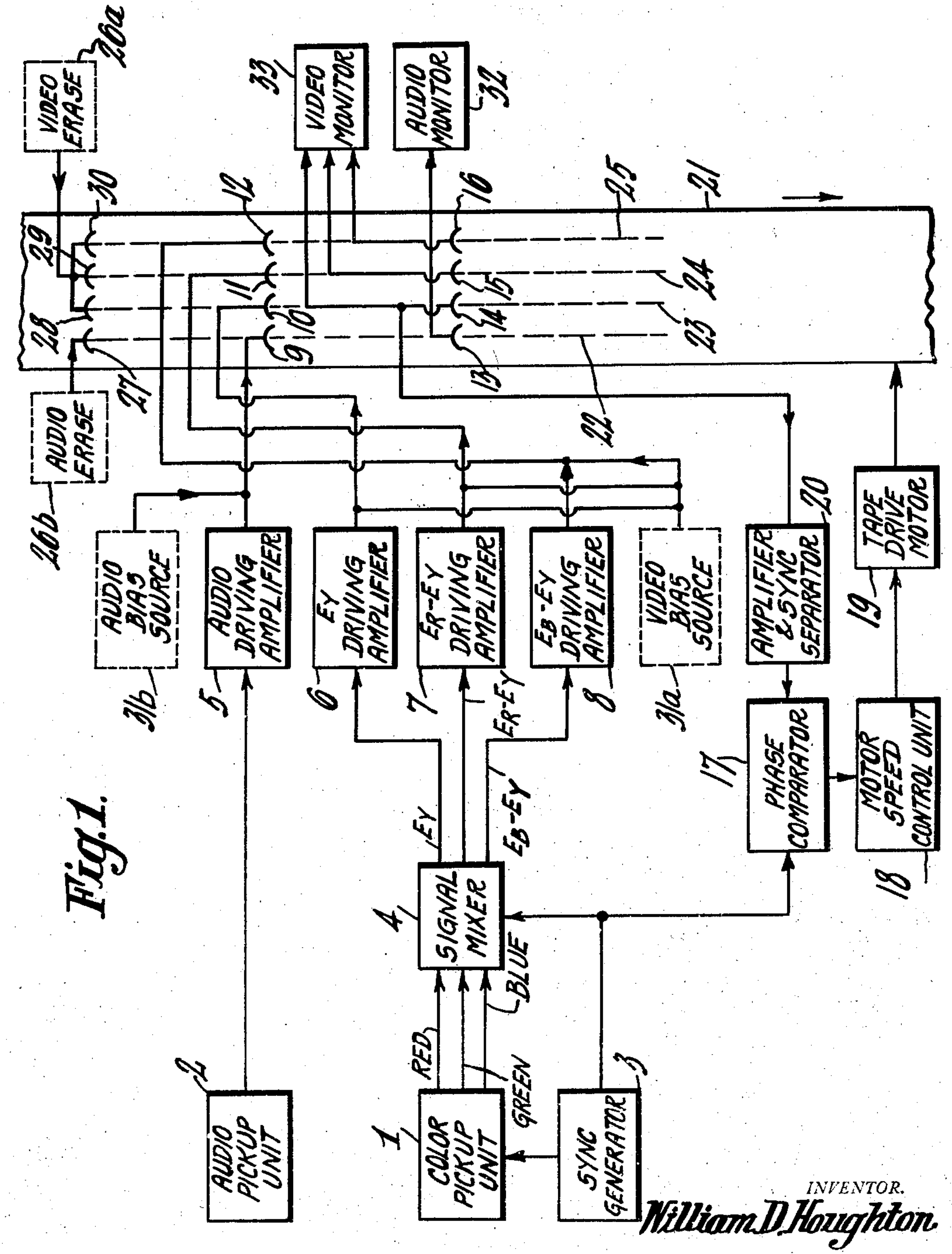
Figure 1 is a block diagram of the equipment of one form of the present invention required for recording the desired information.

Referring to Figure 1, color pickup unit 1, which may be an ordinary color television camera or its equivalent, views the object to be televised and derives signals corresponding to the intensities of the various hues existing therein. No gamma correction device is illustrated, but to obtain the proper monochrome and color difference signals in accordance with field test signal specifications of the NTSC as described in an article appearing in Electronics, February 1952, page 88, this process must be performed at this point. It has been omitted merely for clarity and simplicity of explanation, since it is not a part of the present invention and is not necessary for an understanding of the invention.

A sound or audio pickup device 2 such as a microphone is also employed, and its output is applied to audio driving amplifier 5. Here the proper level of amplitude is obtained and used to energize transducer 9 which is substantially in contact with the magnetic tape. The transducer 9 impresses the audio signals, which have been amplified in amplifier 5, upon track of the tape 22. No details of amplifier 5 are provided herein as the state of the audio magnetic recording art is sufficiently advanced that any one of a number of suitable amplifiers may be used interchangeably. Similarly transducer 9 need not be specially designed and may possess only such characteristics as are necessary to provide the sound playback quality desired.

Voltages representative of the three primary colors red, green and blue are applied to signal mixer 4 from the output of pickup unit 1. The luminance signal, $E_Y$, is produced by adding in the mixer 4 predetermined amounts of each of the three primary color voltages $E_R$, $E_B$, $E_G$ in accordance with NTSC signal specifications. Within the signal mixer 4 there are stages which add red and blue signals respectively to the luminance signal so as to derive color difference signals $E_R-E_Y$ and $E_B-E_Y$. It is also possible, however, to derive the luminance signal from a standard black and white pickup camera.

A sync generator 3 is coupled to pickup unit 1 and to signal mixer 4. The sync generator 3 is a highly stable source of synchronizing pulses and is used in the pickup unit to control the camera circuits in a conventional manner. It is also used to produce the necessary blanking and sync signals. One output of generator 3 is coupled to the mixer 4 for inserting the sync signal into the color difference signals or into the luminance signal. The sync pulses may be added to all of the signals, as desired in mixer 4 or just to any one of them such as the luminance or $E_Y$ signal, for example. There is also another coupling from sync generator 3 to phase comparator 17 for stabilizing the velocity of motor unit 19. This stabilizing apparatus will be described in greater detail below.

It is not necessary to modulate either a carrier or subcarrier according to this invention because neither the carrier nor subcarrier is recorded as such. The output of the mixer 4 is comprised of the luminance signal and two color difference signals which are applied to driving amplifiers 6, 7 and 8 respectively. The latter may be identical and contain special equalizing stages which peak high frequencies, introduce an appreciable intermediate frequency phase shift in the frequency range from 100 kc. to 1 mc., and boost low frequencies so that on playback the reproduced image has a high degree of fidelity. A block diagram of one of these driving amplifiers constitutes Figure 2 herein and will be explained in more detail below. These driving amplifiers and their circuitry are contained in my co-pending application noted above bearing Serial No. 519,420. These driving amplifiers produce, in conjunction with the inherent characteristics of recording transducers 10, 11 and 12 and the characteristics of the recording tape, certain effects upon the color and luminance signals such that on playback through a matched system to be discussed in connection with Figure 3, the signals are approximate replicas of the signals from signal mixer 4. It is, of course, possible to use other driving amplifiers which produce similar results.

There are some presently known recording heads, when used with proper driving equipment, which have recorded frequencies as high as 100 kc. upon magnetic tapes. It is, of course, possible to use these heads as transducers 10, 11 and 12, but it is obvious that since a great deal of color detail lies in a region far above 100 kc., signals thus recorded would produce an image having relatively low fidelity. It is, therefore, presently preferable to use transducing heads capable of recording frequencies above 100 kc., an example of which is disclosed in the copending application of J. A. Zenel and A. R. Morgan, Serial No. 380,854 filed Sept. 17, 1953 and assigned to the same assignee as the present invention.

Best recording results have been obtained when the magnetic tracks 22, 23, 24 and 25 have been erased or subjected to a magnetic field prior to the impressing action of transducers 9, 10, 11 and 12. In a dashed line block *26a*, a video erase means is depicted as supplying energy to a set of transducers 28, 29 and 30 which are placed ahead of the set of transducers 10, 11 and 12. For the audio track 22, transducer 27 may be energized according to well known methods by audio erase *26b*. These may consist of, for example, either a supersonic high frequency signal having frequencies at least two or three times as high as the highest audio frequency, or a constant magnetic field derived from a D.-C. source or a permanent magnet.

As to video tracks 23, 24 and 25, however, supersonic or high frequency erase does not result in the same degree of fidelity as that obtained by a constant magnetic field erase. This constant magnetic field presaturates the tracks 23, 24 and 25 and may be derived either by the application of a direct current to transducers 28, 29 and 30 or, as stated above, by a permanent magnet in close proximity to these tracks. The erase means *26a* is not indispensable, but if its action is omitted, pictures of lower fidelity result. It is also to be noted that video bias source *31a* shown in dashed lines also supplies energy to transducers 10, 11 and 12. If highest fidelity is desired, such bias application is invaluable. Audio transducer 9 may be energized by audio bias source *31b*.

Although one of the earliest systems of bias in magnetic recording was a so-called D.-C. bias, it was largely supplanted by so-called A.-C. bias in later years. This A.-C. bias consisted in applying a high frequency current together with the signals to be recorded to the transducers. The A.-C. was not modulated by the information signals but was merely added or superimposed. This type of bias served to remove all previous magnetization, intentional or accidental, from the recording medium and resulted in greater fidelity and expanded dynamic range.

In the present invention, the use of a high frequency bias has presented certain problems. To avoid beat notes with the high frequency video signals, it is necessary that the bias frequency be somewhat higher than the highest video frequency, usually by a factor of three or four. When frequencies this high are used, the recording head risks being burned out as the inductance components of the head would present a high impedance to the bias signal resulting in an increased power loss for a given value of current. Accordingly in one form of the invention, a D.C. bias is used which sets the operating point at a desired value on the residual magnetization versus magnetizing force curve of the recording medium. It is merely added to the information signals in the recording heads 10, 11 and 12.

A set of playback transducing heads 13, 14, 15 and 16 is located substantially in contact with tracks 22, 23, 24 and 25 respectively. This set is adapted to take off information which has just been recorded by transducers 9, 10, 11 and 12. The signals thus recovered from the tape may be applied to audio monitor 32 and to color video monitor 33 so as to enable maintenance of constant surveillance over the quality of the recorded signals. Track 23, which contains essentially black and white television signals, also contains horizontal and vertical synchronizing signals. Since a uniform rate of travel of the magnetic tape past the transducers 9, 10, 11 and 12 should be maintained to prevent distortion, it is usually desirable to provide a method for constant control of the tape transport velocity.

As has been described in my copending application assigned to the present assignee, Serial No. 369,874 filed July 23, 1953, now abandoned, the following method will give good results. An amplifier and sync separator 20 removes the horizontal sync pulses from the luminance signal on track 23, or from any other track on which such pulses appear, and applies them to one input of phase comparator 17. To another input to comparator 17, sync pulses from sync generator 3 are applied. Sync generator 3 is highly stable and thus may be used as a reference for the phase of sync pulses obtained from sync separator 20. Comparator 17, which is coupled to generator 3 and to separator 20 may be used in one of several ways for controlling the motor speed control unit 18. It may be adjusted so that the normal operating condition occurs when the inputs from generator 3 and separator 20 are in phase. However, it is also possible to maintain a constant differential in the time of arrival of the two sets of sync pulses so that a desired error voltage is the normal operating condition. Control unit 18 includes means for either braking or accelerating the tape drive motor unit 19 which is coupled to the magnetic tape 21. Details of the construction and operation of this synchronizing system are not essential to an understanding of the present invention but may be found in the last mentioned copending application.

Figures 2, 3:
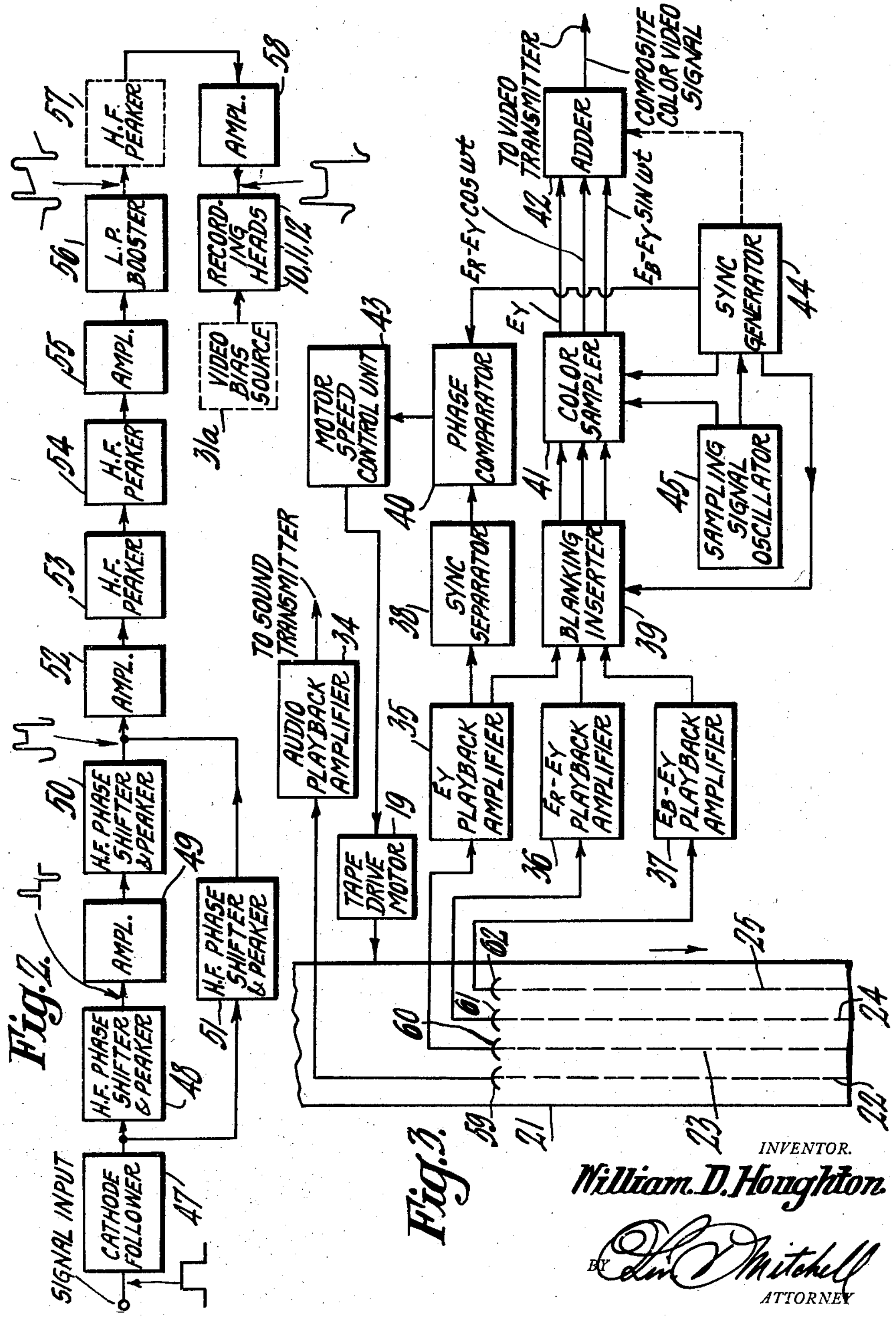
Figure 2 is a block diagram of a recording driving amplifier used in recording the color signals; and, Figure 3 is a block diagram of equipment used in one form of the invention for playing back the recorded signals.

The operation of the recording driving amplifier shown in Figure 2 is as follows: signals from signal mixer 4 of Figure 1 are applied to a cathode follower stage 47 whose output is coupled to high frequency phase shifter and peaker 48. The output of the latter is applied to an amplifier 49 and from there to a second high frequency phase shifter and peaker 50.

Another portion of the output of cathode follower stage 47 is applied to a third high frequency phase shifter and peaker 51. The outputs of shifters and peakers 50 and 51 are applied to an amplifier stage 52 and from there to a high frequency peaking circuit 54. It is to be noted that high frequency peaker 53 may be inserted between amplifier 52 and peaker 54 to provide some additional peaking if desired. It is shown in dashed lines because its use is optional. The output of amplifier 55 is applied to a low frequency booster 56 whose output is coupled to an amplifier 58 through high frequency peaker 57. The latter is also shown in dashed lines since it is not absolutely essential, but when used makes for even greater fidelity in the recorded image. Amplifier 58 may consist of one or more stages, as desired, to drive one of the recording heads 10, 11 and 12. Bias source 31*a* which can be any of the variants mentioned above, or which may be dispensed with if lesser fidelity can be tolerated, is also coupled to the recording heads 10, 11 and 12.

Assuming that a square wave is applied to the input of cathode follower 47 (a composite video wave itself may be considered to be an amplitude modulated pulse with a frequency of 15,750 cycles per second) its shape will be as illustrated in the output of stage 48. At the output of stage 50 it is to be noted that in one typical operating condition, there is a relatively wide anticipatory undershoot followed by a relatively narrow overshoot on the leading edge, and then a relatively wide overshoot followed by a relatively narrow undershoot on the trailing edge. This indicates that there has been a certain amount of high frequency peaking and an appreciable phase shift in the intermediate frequency range, i.e., from about 100 kc. to 1 mc. At the output of booster 56 the wave takes the shape shown, wherein there is a certain amount of low frequency boost evidenced by the slope of the central portion of the wave. Across recording heads 10, 11 and 12, the voltage wave form takes a slightly different shape as shown. By manipulation of variable elements located in this driving amplifier, the phase shift and the peaking amplitude may be varied to produce different waveshape dimensions for varying input conditions and for transducing heads having different characteristics. Of course, the driving amplifier may take any other suitable form as stated above.

Referring to the playback system shown in Figure 3, a number of playback transducers 59, 60, 61 and 62 are positioned in contact with tracks 22, 23, 24 and 25 respectively. As the tape 21 is drawn past these transducers, the magnetic variations contained therein are converted into electrical variations which are fed to amplifiers 34, 35, 36 and 37. Audio amplifier 34 may be any one of a number of well known playback amplifiers capable of reproducing frequencies up to about 15,000 cycles per second. Audio playback transducer 59 similarly may be any conventional head. Transducers 60, 61 and 62 should be able to respond to frequencies from 200 cycles to approximately 3 mc. and may be constructed according to the teachings of the Zenel application referred to previously. The three components of the complete color television signal and namely the luminance signal, the two color difference signals which contain sync and blanking pulses, are applied to amplifiers 35, 36 and 37 which have a high signal-to-noise ratio and have a high degree of sensitivity. These playback amplifiers may be constructed according to the circuits contained in my copending application, Serial No. 519,420 referred to above. The characteristics of the input double "cascode" stages combined with the other equalizing action of this type of amplifier are so matched with the driving amplifier as to produce on playback signals which are essentially uniform for the entire range of frequencies emanating from the pickup unit of Figure 1. It is to be understood, of course, that other playback amplifiers may be used which produce similar results without in any respect departing from the essence of this invention.

The output of audio amplifier 34 may be passed immediately to a utilization circuit which may be, for example, the transmitter for the sound channel.

In this form of the invention, the sync pulses have been inserted into all of the components, but it is understood that they may be inserted into any one or combination thereof, as the case may be. It is necessary, however, to use the components in such a fashion that the required composite video output wave is obtained. It is also necessary to insert portions of the color subcarrier oscillation known as "burst," periodically into the composite signal. A description of the burst and an explanation of its operation may be found in an article appearing in "Electronics" for February 1952, page 96. Specifications for the burst were adopted on May 20, 1952 by the NTSC, and have since been standardized for United States broadcast purposes by the Federal Communications Commission.

Accordingly, the output wave of amplifier 35 is divided into two parts. One part may be used with a special system for maintaining the velocity of the tape constant past transducers 59, 60, 61 and 62. The other part is fed to the input of blanking inserter 39. To the latter sync generator 44 is also coupled. The color difference signal amplifiers 36 and 37 are also coupled to inserter 39. During the blanking interval already existing in the recovered components, the blanking pulses from generator 44 which have been fed to inserter 39 cut out all noise, sync or other signals which appear in the recorded components during this time. In order to accomplish this, the blanking inserter 39 is operated by suitable signals from sync generator 44. In this manner, any inaccuracies or noise which have gotten into the reproduced components are eliminated and new blanking pulses which have been produced to rigid specifications may be inserted.

The sync generator 44 is electronically locked to a highly stable local reference or sampling oscillator 45. The signal now contains accurate new blanking pulses, and is ready to modulate the subcarrier and to have sync pulses and burst added. Sync generator 44 is coupled to sampler 41 for two purposes. One is to insert sync into the components, and the other is to gate in short portions of the output of oscillator 45 on the back porch of horizontal blanking pulses to produce the burst. The sampling oscillator 45 is also coupled to sampler 41 so that the various phases of the local oscillations may be modulated by the said color difference signals. In the sampler 41, the 3.58 mc. wave from oscillator 45 is modulated at cos $\omega t$ by the red color difference signal $E_R-E_Y$. At sin $\omega t$ the wave is modulated by the blue color difference signal $E_B-E_Y$. At the outputs of sampler 41 in this form of the invention the signals are: the reproduced $E_Y$ signal and the products of the modulation of the wave by the two color difference signals, all of which signals contain new blanking, new sync and burst. They are fed to signal adder 43 where the modulation products and the $E_Y$ signal are combined, resulting in an output that may be fed to an appropriate utilization circuit, for example, a television transmitter or monitor.

Figure 3 also illustrates another point at which the new sync signals may be added by the dashed line connecting generator 44 with adder 42. The point at which the new blanking and sync pulses are added is not of great importance since the essence of this feature of the invention is the fact that the reproduced signals are wiped out during the blanking interval and new sync, blanking and burst are added. Those skilled in the art can doubtlessly design a great variety of equipment for this purpose.

As mentioned above, a portion of the output of amplifier 35 may be applied to a system for maintaining the tape velocity constant past transducers 59, 60, 61 and 62. In such a manner, the phase of the recorded blanking interval is maintained essentially in synchronism with the new blanking signals produced by generator 44. The system comprises a sync separator 38 which removes sync from the $E_Y$ signal and applies it to one input of pulse phase comparator 40. Sync pulses having highly stabilized phase characteristics are produced by sync generator 44, and applied to another input of comparator 40. Should there be a difference in the phase of pulses from separator 38 and generator 44 respectively an error voltage will be produced in the output of comparator 40 which is applied to motor speed control unit 43. The latter is adapted to either accelerate or decelerate the speed of motor 19 to which it is coupled. The latter determines the rate of travel of the tape and insures the correct phase relation of the recorded blanking to the blanking produced by generator 44, as well as the correct frequency and phase characteristics of the color difference signals as reproduced.

While the present invention has been described so far in terms of the transmission of a composite color video wave having a subcarrier which is quadrature modulated by $E_R-E_Y$ and $E_B-E_Y$ signals respectively after the magnetic signals representative of color difference and luminance components have been recovered, it is to be understood that with but minor changes in the color sampler 41 signals meeting the field test signal specifications of the NTSC adopted on February 2, 1953 may be generated on which the present specifications prescribed for U.S. color television broadcast by the F.C.C. were based. These signal specifications call for the production of three components: a full bandwidth $E_Y$ signal, a so-called "I" signal having frequency components up to about 1.5 mc. and a so-called "Q" signal which is greatly attenuated beyond 400 kc. The "I" and "Q" signals are used to modulate a subcarrier in quadrature phase and the "I" signal in the frequency range above 400 kc. produces edge colors which lie along an optimum axis of the C.I.E. chromaticity triangle, i.e., from orange through white to cyan. By the use of so-called "matrix" stages in the color sampler it is possible to derive the "I" and "Q" signals from the color difference signals. These matrix units consist mainly of adders and polarity reversers which combine the color signals in certain amounts to meet the NTSC specifications. An explanation and description of the theory underlying the "I" and "Q" color system and describing apparatus for producing the desired vectorial components may be found in the copending application of D. H. Pritchard, filed May 7, 1953, Serial No. 353,657, and assigned to the present assignee. The present U.S. color television broadcast standards were set forth in F.C.C. Public Notice No. 53–1663 which was adopted December 17, 1953.

It is evident that, even though color difference signals in this invention have been recorded and recovered, one could derive the original primaries from them if desired. For example, if for any reason the color difference signals were obtained from a color receiver, they could be transformed into primary color signals and applied to a monitor which is responsive to primary colors. The primary color signals so derived could also be employed for retransmission by a different system which could be useful in industrial or special purpose applications.

Having described the invention, what is claimed is:

1. A system for reproducing from a moveable medium magnetically recorded color television signals having a luminance component and a plurality of color difference signal components each of which contains blanking and synchronizing pulses comprising in combination, a plurality of playback transducers, each transducer being substantially in contact with said medium for converting one of said recorded components into electrical variations, a plurality of playback amplifiers, each of said amplifiers being coupled to one of said transducers, means for generating oscillations of a subcarrier frequency, means coupled to said oscillation generator for producing synchonizing and blanking pulses, a color sampler coupled to said synchronizing and blanking pulse producing means and said generator, means coupled to said amplifiers, said color sampler and said synchronizing and blanking pulse producing means for blanking out said components substantially during intervals in which said recorded blanking pulses occur, in response to blanking pulses from said syncronizing and blanking pulse producing means, means for applying said components containing said new blanking signals to said color sampler, said color sampler being adapted to modulate said oscillations from said generator by said color difference signal components containing said new blanking signals, said color sampler further being adapted to insert burst in response to said synchronizing pulses from said synchronizing and blanking pulse producing means, said sampler further adapted to insert new synchronizing signals into said components, and means coupled to said sampler for combining said luminance component with said modulated subcarrier.

2. In a system for reproducing magnetically recorded color television signals having a luminance component and a plurality of color difference signal components each of which contains blanking and synchronizing pulses, apparatus for inserting new blanking, synchronizing and burst comprising in combination, a plurality of playback amplifiers adapted to receive said components, a source of oscillations of a subcarrier frequency, means coupled to said source for producing synchronizing and blanking pulses, a color sampler means coupled to said synchronizing and blanking pulse producing means, means coupled intermediate said amplifiers and said sampler for blanking said components during intervals in which said recording blanking and synchronizing pulses occur in response to blanking pulses from said synchronizing and blanking pulse producing means, said sampler being adapted to modulate means for applying said newly blanked components to said sampler, said oscillations by said color difference components containing said new blanking pulses, said sampler being further adapted to insert portions of said oscillations periodically into said components in response to synchronizing pulses from said synchronizing and blanking pulse producing means, and means coupled to said sampler and to said synchronizing generator for combining said modulated oscillations and said luminance component, said combining means also being adapted to add new synchronizing signals from said synchronizing and blanking pulse producing means to said combined components.

3. A system for reproducing from a moveable medium magnetically recorded color television signals having a luminance component and a plurality of color difference signal components each of which contains blanking and synchronizing pulses comprising in combination, a plurality of playback transducers, each transducer being substantially in contact with said medium for converting one of said recorded components into electrical variations, a plurality of playback amplifiers, each of said amplifiers being coupled to one of said transducers, means for generating oscillations of a subcarrier frequency, means coupled to said generator for producing synchronizing and blanking pulses, a color sampler coupled to said synchronizing and blanking pulse producing means and to said generating means, means coupled to said amplifiers, to said color sampler and to said synchronizing and blanking pulse producing means for blanking out said components during intervals in which said recorded blanking and synchronizing pulses occur and for inserting new synchronizing signals into said components during said intervals, means for applying said components containing said new blanking and synchronizing pulses to said sampler, said sampler being adapted to derive "I" and "Q" signals from said color difference signal components, said sampler being further adapted to modulate quadrature phases of said subcarrier oscillations by said "I" and "Q" signals, and means coupled to said color sampler for combining said modulated subcarrier oscillations with said luminance component.

4. A system for reproducing from a moveable medium magnetically recorded signals representative of the sound, hue and brightness of a televised object, at least one of said hue and brightness signals containing blanking and synchronizing pulses, comprising in combination, a plurality of playback transducers, each transducer being substantially in contact with said medium for converting each one of said recorded signals into electrical variations, a plurality of playback amplifiers, each of said amplifiers being coupled to receive said variations from a different one of said transducers, means for generating oscillations of a certain frequency, means coupled to said generating means for producing synchronizing and blanking pulses, means coupled to said amplifiers which receive said variations containing said recorded blanking and synchronizing pulses and to said synchronizing and blanking pulse producing means for blanking said variations during intervals in which said recorded blanking and synchronizing pulses occur, said last-named blanking means also being adapted to insert new synchronizing pulses into said variations during said intervals, and a utilization circuit coupled to said blanking means for said variations containing said new blanking and synchronizing pulses.

5. A system for recording and reproducing television signals by means of a moveable magnetic medium, said signals including a plurality of components representative of the hue and luminance of televised objects which have been blanked at recurrent intervals, said system comprising in combination a plurality of means for simultaneously impressing each of said components on a corresponding distinct portion of said medium, a plurality of means for simultaneously recovering each of said recorded components from a corresponding one of said distinct portions, means for removing said recovered components substantially during said recorded blanking intervals, means for inserting synchronizing information into said recovered components during said intervals, and a utilization circuit for said recovered components containing said inserted synchronizing information.

6. The invention according to claim 5 with the addition of means for inserting a burst of oscillations having an interlaced frequency related to that of said synchronizing information into said recovered components during said intervals.

7. A system for reproducing television signals recorded on a moveable magnetic medium, said television signals including components respresentative of the brightness of televised objects which have been blanked at recurrent intervals and further including synchronizing information, said system comprising in combination means for recovering said recorded signals, means for removing the blanked components of said recovered signals substantially during said blanking intervals, means for inserting new synchronizing information during said blanking intervals into said recovered signals, and a utilization circuit for said recovered signals containing said new synchronizing information coupled to said inserting means.

8. A system for reproducing color television signals recorded on a movable storage medium, said color television signals including color, brightness, and synchronizing components, said system including: means for recovering said recorded color television signals from said medium; means for removing said synchronizing components from said recovered signals; a source of a wave having a predetermined frequency; means coupled to said source for generating television synchronizing pulses having a fixed timing relation to said predetermined frequency wave; and means coupled to said removing means, to said source, and to said synchronizing pulse generating means for forming a composite color television signal from said recovered components.

9. A system for reproducing color television signals recorded on a movable magnetic medium, said color television signals including color, brightness, and synchronizing components, said system including: means for recovering said signals from said medium; means for removing said synchronizing components from said recovered signals; a signal source having a standard color subcarrier carrier frequency; means coupled to said signal source for generating standard television synchronizing pulses bearing a fixed timing relation to said subcarrier frequency signal; means for effectively modulating the signal from said source with said recovered components from which said synchronizing components have been removed; means coupled to said synchronizing pulse generating means and to said removing means for combining said synchronizing pulses and said recovered signals from which said synchronizing components have been removed; and means coupled to said signal source and to said removing means for inserting a burst of said standard carrier frequency, whereby a composite color television signal is obtained.

10. A system for reproducing color television signals recorded on a movable magnetic medium, said color television signals including components representative of the luminance and hue of televised objects which have been blanked at recurrent intervals in which synchronizing components have been inserted, said system including: means for recovering said components from said medium; means for removing said synchronizing components from said recovered components during said blanking intervals; a signal source for generating a signal having a standard television color subcarrier carrier frequency; means coupled to said signal source for generating standard television synchronizing pulses; said color subcarrier frequency being an odd multiple of one-half the rate of occurrence of the horizontal line synchronizing pulses; means coupled to said synchronizing pulse generating means and to said removing means for inserting said synchronizing pulses into said recovered components from which said synchronizing components have been removed during said blanking intervals; said inserting means also coupled to said signal source for inserting bursts of said standard carrier frequency signal into said recovered components during said blanking interval; and means coupled to said inserting means and to said signal source for forming a composite color television signal.

References Cited in the file of this patent

UNITED STATES PATENTS

| | | |
|---|---|---|
| 1,877,447 | Friebus | Sept. 13, 1932 |
| 2,427,421 | Rieber | Sept. 16, 1947 |
| 2,517,808 | Sziklai | Aug. 8, 1950 |
| 2,629,784 | Daniels | Feb. 24, 1953 |
| 2,685,618 | Rettinger | Aug. 3, 1954 |

OTHER REFERENCES

Magnetic Recording, by S. J. Begun, pages 54–57, copyright 1949.